(12) United States Patent  
Forrest et al.

(10) Patent No.: US 11,237,965 B2
(45) Date of Patent: *Feb. 1, 2022

(54) CONFIGURABLE SNOOP FILTERS FOR CACHE COHERENT SYSTEMS

(71) Applicant: Arteris, Inc., Campbell, CA (US)

(72) Inventors: Craig Stephen Forrest, San Francisco, CA (US); David A. Kruckemyer, San Jose, CA (US)

(73) Assignee: ARTERIS, INC., Campbell, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 14/588,325

(22) Filed: Dec. 31, 2014

(65) Prior Publication Data

US 2016/0188471 A1 Jun. 30, 2016

(51) Int. Cl.
*G06F 12/00* (2006.01)
*G06F 12/0817* (2016.01)

(52) U.S. Cl.
CPC .... *G06F 12/0828* (2013.01); *G06F 2212/621* (2013.01); *Y02D 10/00* (2018.01)

(58) Field of Classification Search
CPC G06F 2212/621; G06F 12/0828; Y02D 10/00
See application file for complete search history.

(56) References Cited

U.S. PATENT DOCUMENTS

| | | | | |
|---|---|---|---|---|
| 6,810,467 B1* | 10/2004 | Khare | ........... | G06F 12/0822 711/140 |
| 6,880,050 B1* | 4/2005 | Korger | ........... | G06F 5/12 710/55 |
| 2003/0005236 A1* | 1/2003 | Arimilli | ........... | G06F 12/0831 711/146 |
| 2003/0135768 A1* | 7/2003 | Knee | ........... | G06F 1/3203 713/300 |
| 2006/0212660 A1* | 9/2006 | Mattina | ........... | G06F 12/0831 711/146 |
| 2006/0224838 A1 | 10/2006 | Blumrich | | |
| 2006/0294314 A1* | 12/2006 | Cheng | ........... | G06F 12/082 711/136 |
| 2008/0209133 A1* | 8/2008 | Ozer | ........... | G06F 12/0831 711/146 |
| 2009/0300289 A1* | 12/2009 | Kurts | ........... | G06F 12/0831 711/133 |
| 2012/0096225 A1* | 4/2012 | Khawand | ........... | G06F 12/0848 711/119 |
| 2013/0042078 A1* | 2/2013 | Jalal | ........... | G06F 12/0815 711/146 |

(Continued)

*Primary Examiner* — Gurtej Bansal

(74) *Attorney, Agent, or Firm* — Dana Legal Services; Jubin Dana

(57) ABSTRACT

A cache coherent system includes a directory with more than one snoop filter, each of which stores information in a different set of snoop filter entries. Each snoop filter is associated with a subset of all caching agents within the system. Each snoop filter uses an algorithm chosen for best performance on the caching agents associated with the snoop filter. The number of snoop filter entries in each snoop filter is primarily chosen based on the caching capacity of just the caching agents associated with the snoop filter. The type of information stored in each snoop filter entry of each snoop filter is chosen to meet the desired filtering function of the specific snoop filter.

4 Claims, 7 Drawing Sheets

(56) References Cited

U.S. PATENT DOCUMENTS

| | | | |
|---|---|---|---|
| 2014/0052905 A1 | 2/2014 | Iulin | |
| 2015/0278097 A1* | 10/2015 | Kelm | G06F 9/3836 |
| | | | 711/135 |
| 2015/0370707 A1 | 12/2015 | Patsilaras et al. | |

* cited by examiner

FIG. 3 snoop filter entry state 1b
3b
+ 5b
9b 9b x (16K lines x 3 agents + 64 lines x 2 agents) = 433 Kb

CONFIGURABLE SNOOP FILTERS FOR CACHE COHERENT SYSTEMS

FIELD OF THE INVENTION

The disclosed invention is in the field of computer systems and, more specifically, related to systems that include coherent heterogeneous caching agents.

BACKGROUND

In cache coherent systems requests from different caching agents for the same cache line pass through a point of serialization for the cache line address. The point of serialization for each cache line address establishes the order of requests from the different caching agents and may be implemented as a shared bus in some systems or as a distinct logic block in other systems. There may also be multiple points of serialization implemented in a system, in which case, multiple buses or logic blocks may be implemented. Once a request to a cache line address has been serialized, the caches in the system are queried to find the most recent copy of data or to eliminate stale copies of data so that an agent may update its copy of data. Other forms of queries are also possible, and the queries may be known as probes or snoops.

Snoops consume system interconnect bandwidth, cause transaction delay, and disrupt the operation of the queried caching agents. For this reason, cache coherent systems implement snoop filters, which attempt to minimize snoop traffic in the system interconnect and reduce the frequency of caching agent disruptions. A snoop filter includes a filtering algorithm and storage of caching agent state information in a number of snoop filter entries. The effectiveness of a snoop filter is related to the filtering algorithm, the number and organization of the snoop filter entries, and the type of state information stored in each snoop filter entry. A more effective snoop filter requires fewer snoops to maintain cache coherence, while a less effective snoop filter requires more snoops to maintain cache coherence.

A caching agent or group of caching agents is typically associated with a single snoop filter. Each snoop filter for an agent or group of agents may be distributed with the agent or group, or all snoop filters in the system may be logically centralized, e.g. at the point of serialization for a cache line address. A centralized collection of snoop filters is typically called a directory. Other organizations of agents and snoop filters may be possible. For example, a snoop filter may be implemented in a cache logically located at an intermediate level of the memory hierarchy between first, the caches of the caching agent or group of caching agents associated with the snoop filter, and second, main memory. This type of cache is commonly known as a shared lower-level cache, and in such a cache, the snoop filter may be integrated into the cache tags if the shared cache at the lower-level of the memory hierarchy is inclusive of the caching agent caches at a higher-level of the memory hierarchy.

Only until recently have systems been designed with coherence between heterogeneous caching agents with different characteristics. At present, snoop filters in conventional heterogeneous systems may not be optimized to take advantage of these different characteristics. Therefore, what is needed is a system and a method that configures snoop filters to optimize storage space and filter efficiency based on caching agent characteristics.

SUMMARY OF THE INVENTION

A system and method are disclosed, in accordance with the aspects of the invention, that configures snoop filters to optimize storage space and filter efficiency based on caching agent characteristics. One aspect of the invention is directed to a cache coherent system of caching agents and a plurality of snoop filters within directories, wherein at least some number of caching agents are associated with different snoop filters from each other. The association of caching agents to snoop filters can be based on coherency domains, based on power domains, based on cache size, among other bases for association. The association of caching agents to snoop filters may also be dynamic within manufactured chips.

The different snoop filters may use different filtering algorithms. The different filtering algorithms may be rely on different types of information, such as stored owner pointers or stored presence vectors. Different snoop filters may also have different numbers of entries.

Embodiments of the invention, based on the various aspects of the invention, include hardware description language descriptions of systems according to the invention, software to generate such hardware descriptions, chips built according to such hardware descriptions, and methods of designing systems according to the invention using software according to the invention.

BRIEF DESCRIPTION OF THE DRAWINGS

FIG. 3 illustrates the presence of cache lines within caching agents as represented by a single set of snoop filter entries in accordance with the various aspects of the invention.

DETAILED DESCRIPTION

Figure 1:
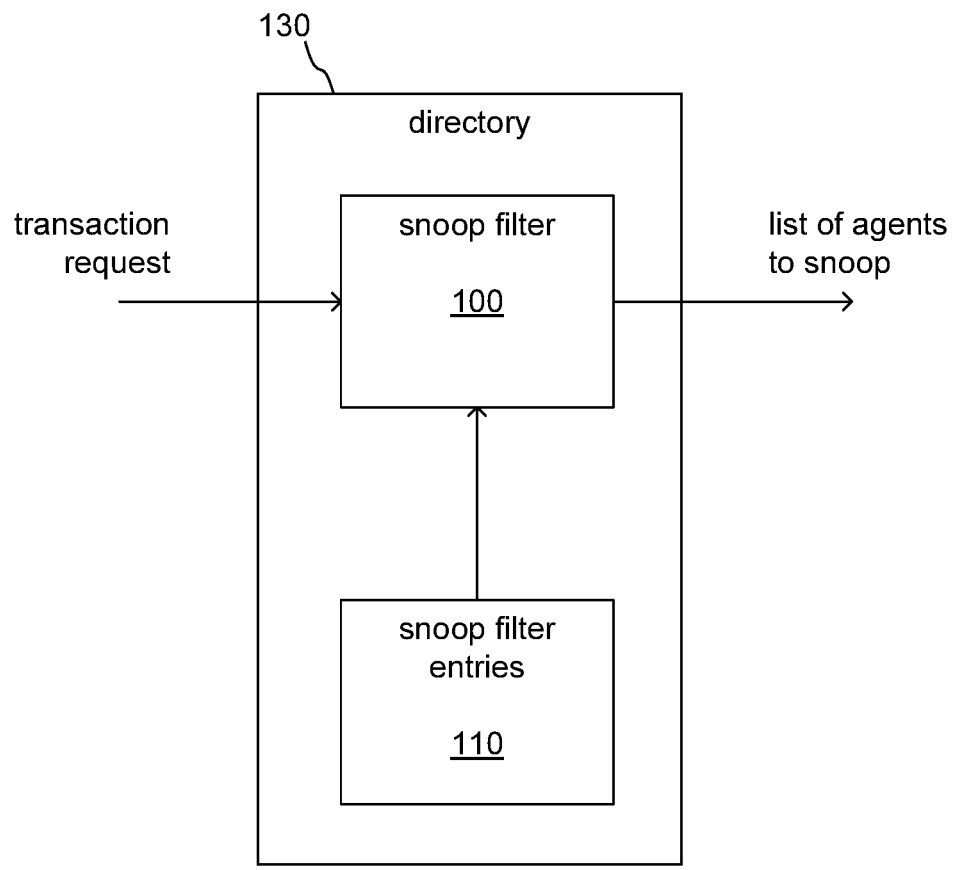
FIG. 1 illustrates the basic function of a snoop filter within a directory in accordance with the various aspects of the invention.

Before describing in detail the embodiments that are in accordance with invention, it should be observed that the embodiments reside primarily in combinations of method step and apparatus components related to facilitating the invention. Accordingly the components and method steps have been represented where appropriate by conventional symbols in the drawing showing only those specific details that are pertinent to understanding the embodiments of the present invention so as not to obscure the disclosure with details that will be readily apparent to those of ordinary skill in the art having het benefit of the description herein.

Unless defined otherwise, all technical and scientific terms used herein have the same meaning as commonly understood by one of ordinary skill in the art to which this invention belongs. Any methods and systems, similar or equivalent to those described herein, can also be used in the practice of the invention. Representative illustrative methods and embodiments of systems are also described in accordance with the aspects of the invention.

The invention relates to the configuration of snoop filters to optimize storage space and filter efficiency based on caching agent characteristics. Separate consideration of the snoop filter entries is provided such that fewer snoop filter entries need to be stored for certain caching agents, or snoop filter entries for certain caching agents need to store less information, or both. Furthermore, the information stored in snoop filter entries can be chosen to optimize the performance of the expected access patterns of different caching agents.

According to an aspect of the invention, each caching agent that might be snooped is associated with one of a number of snoop filters. Typically multiple caching agents are grouped and the group is associated with one of a number of snoop filters, though in some embodiments there could be a one-to-one relationship between each caching agent and its associated snoop filter.

According to an aspect of the invention, each snoop filter determines whether or not to snoop the caching agents associated with the snoop filter based on the filtering algorithm and the snoop filter entries. The filtering algorithm may be a tag filter, in which the snoop filter entries are tagged with a cache line address and filtering is based on comparisons between the tag addresses and the request address. According to an aspect of the invention, the filtering algorithm may be a null filter, in which the snoop filter entries are empty and no filtering is performed. According to various aspects of the invention, other filtering algorithms include Bloom filters, counting Bloom filters, stream registers, etc. Other aspects of the filtering algorithm may impact the number and organization of snoop filter entries and the type of state information stored in each entry. Such state information for a tag filter entry may include a pointer to which caching agent is designated the owner of the cache line, a valid bit that indicates the pointer is valid, and a vector indicating which caching agents have a copy of the cache line. In accordance with the aspects of the invention, this vector may be coarse, in that an element in the vector may represent more than one caching agent, or it may be precise, in that an element in the vector represents exactly one caching agent. If there are multiple snoop filters in a system, the results from all snoop filters form the set of all agents that must be snooped.

In a heterogeneous system, caching agents with different variants of one or more characteristics may be present. Some such characteristics are cache size, cache associativity, cache line size, typical access patterns, presence within a coherency domain, and presence within a power domain. For any given characteristic of caching agents, any number of variants can exist within a heterogeneous system.

In accordance with some aspects, as captured in various embodiments of the invention, the number of snoop filter entries contained in each snoop filter is different. For example, a tag filter whose associated caching agents have small numbers of cache lines needs only a small number of snoop filter entries. A different tag filter, in the same embodiment, whose associated caching agents have large numbers of cache lines needs a large number of snoop filter entries.

In accordance with some aspects, as captured in various embodiments of the invention, the entirety of the types of information stored in each snoop filter entry is different from one snoop filter to another. For example, tag filter entries in one snoop filter might include an owner pointer and tag filter entries in another snoop filter might not. Another such type of information is a presence vector. Another such type of information is the dirtiness of a cache line. Other information may also be stored and the scope of the invention is not limited by the type of information stored.

The process of designing a snoop filter according to the invention involves allocating a certain amount of storage for the snoop filter entries. In accordance with some aspects, as captured in various embodiments of the invention, the storage is implemented in on-chip SRAM; in accordance with some aspects, as captured in various embodiments of the invention, the storage is implemented in off-chip SRAM or DRAM. The number of bits of storage to allocate to a snoop filter, according to some embodiments, is the number of snoop filter entries times the number of bits of information in each snoop filter entry and the scope of the invention is not limited thereby. Thus, in accordance with some aspects of the invention, snoop filter entries from different snoop filters may be stored in the same on-chip. In accordance with some other aspects of the invention, snoop filter entries from different snoop filters may be stored in off-chip memory or may be stored in separate on-chip or off-chip memories. In accordance with some aspects, as captured in various embodiments of the invention, snoop filter entries may also be stored in the cache tags of an inclusive lower-level cache at any level of the memory hierarchy.

In some aspects and embodiments of the invention, different snoop filters use different filtering algorithms to determine which caching agents to snoop. One such algorithm, known as a null filter, is a simple broadcast snoop to all caching agents. Another such algorithm, in accordance with some aspects and embodiments of the invention, is a counting Bloom filter or variant thereupon. Different algorithms require different types of information, as described previously, to be stored in the snoop filter entries of a snoop filter.

In accordance with some aspects, as captured in various embodiments of the invention, different snoop filters are associated with agents in different power domains. This partitioning allows a snoop filter to be powered down when its associated agents are all powered down.

Some caching agent characteristics can vary within a system. For example, in one mode of operation a caching agent might perform a large number of sequential reads of unshared memory, while in a different mode the same caching agent might perform a small number of reads and writes of data shared with many other caching agents. For another example, a caching agent might operate with one-way set associativity in one mode and two-way set associativity in another mode. In some systems according to some aspects of the invention, the mode is software programmable and in other systems, which are according to other aspects of the invention, the mode is configured with a hardware change, such as connecting a jumper or blowing a fuse.

According to an aspect of the invention, the association of caching agents to snoop filters is dynamic. Dynamically associating caching agents with snoop filters allows runtime power and performance optimizations.

The aspects of the invention are typically embodied in system-on-chip devices and integrated in end-user products that use such system-on-chip devices. Such devices and products benefit from lower cost due to the minimization of silicon area needed for storing information in snoop filter entries. Such devices and products also benefit from lower static power consumption due to decreased leakage current resulting from fewer transistors and from lower dynamic power consumption due to more efficient snooping. Since filtering algorithms and state storage are more tailored to the types of agents with which a snoop filter is associated, snoop traffic is optimized for those agents. As a result, such devices and products benefit from higher performance because a reduced number of snoops causes less interruption to the operation of caching agents and less bandwidth consumed on the coherent on-chip network.

EMBODIMENTS AS DEPICTED IN DRAWINGS

Referring now to FIG. 1, a directory-based snoop filter is shown. Specifically, directory 130 includes snoop filter 100 and snoop filter entries 110. The directory 130 receives a transaction request (a transaction includes a transaction request and a transaction response as well as address information), performs a snoop filtering function at the snoop filter 100, based on the state information stored in the snoop filter entries 110, and outputs a list of agents to snoop.

Figure 2:
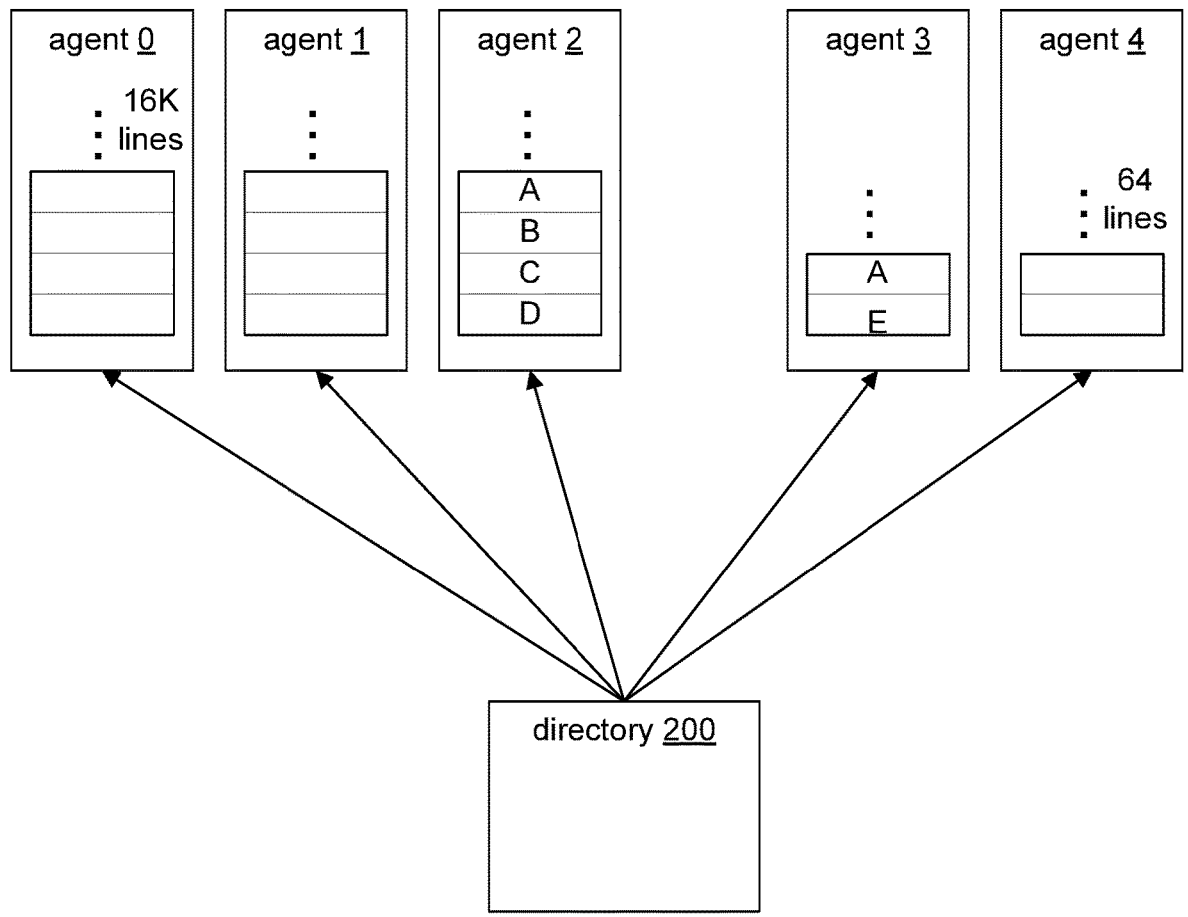
FIG. 2 illustrates a system of five caching agents of two variants of the number of cache lines in accordance with the various aspects of the invention.

Referring now to FIG. 2, according to some aspects of the invention, an embodiment is shown that includes a directory 200 and five agents: agent 0, agent 1, agent 2, agent 3, and agent 4. Agent 0, agent 1, and agent 2 are identical, and each stores 16 k cache lines. Agent 3 and agent 4 are identical and each stores 64 cache lines. All agents receive snoops, from time to time, from the directory 200. The directory 200 includes the snoop filters and sets of snoop filter entries.

The system caching state, at a particular instant in time, is shown in FIG. 2. Agent 2 holds cache lines from four addresses: A, B, C, and D. At that time agent 3 holds cache lines from addresses A and E. Therefore, address A is shared between agent 2 and agent 3. According to the algorithm of the snoop filter, a request for address A will cause snoops to be sent to each of agent 2 and agent 3.

Figure 3:
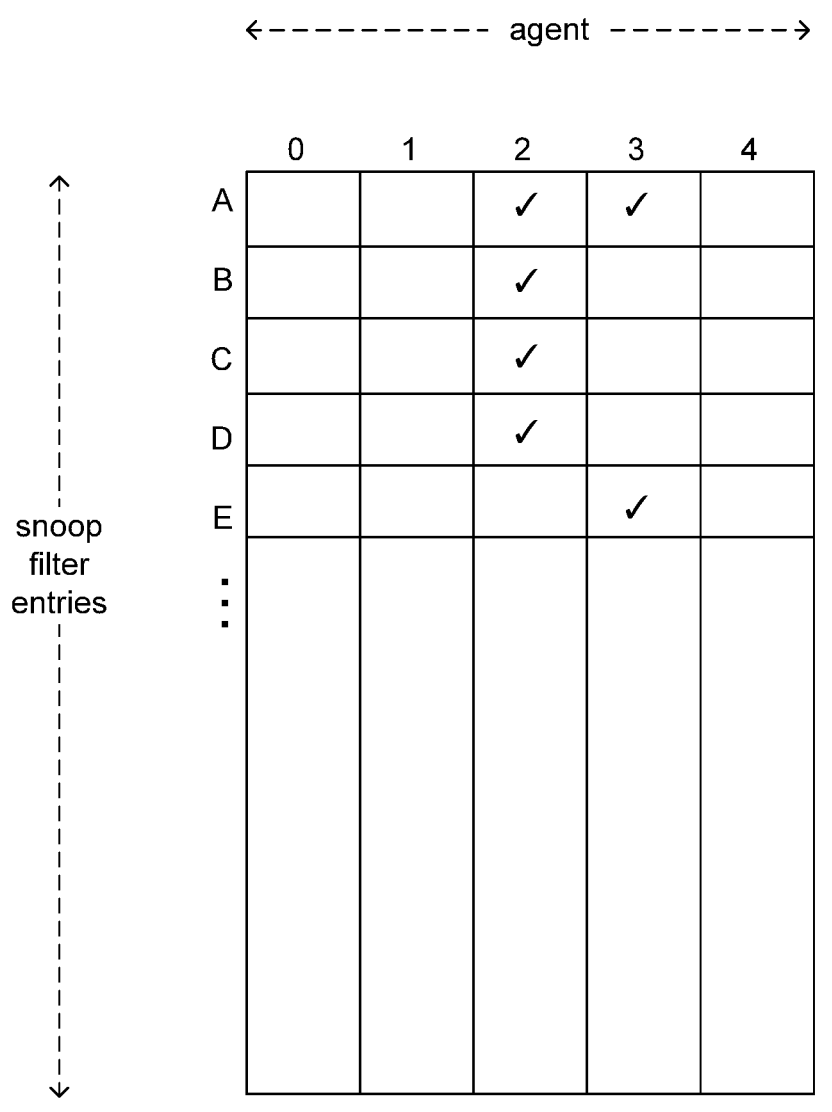

Referring now to FIG. 3, according to some aspects of the invention, a table of, vertically, snoop filter entries in a set of snoop filter entries, and, horizontally, agents is shown. The agents indicated are agent 0, agent 1, agent 2, agent 3, and agent 4. The first five snoop filter entries correspond to addresses A, B, C, D, and E respectively. Tick-marks (or check-marks) indicate, for each snoop filter entry, whether its corresponding line of data is present in the cache of each caching agent.

Figure 4:
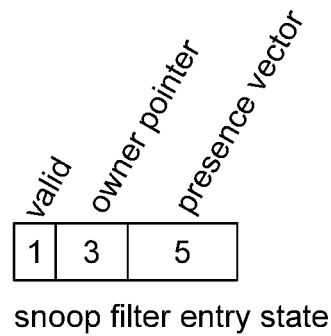
FIG. 4 illustrates the snoop filter entry state information for a system of a single snoop filter and a calculation of bits of storage in accordance with the various aspects of the invention.

Referring now to FIG. 4, in accordance with the aspects of the invention, the total number of snoop filter entries is 49,280—to accommodate the total number of lines that may be present—in the caches of the system is shown. Each snoop filter entry stores one valid bit, an owner pointer, which is three bits in order to indicate one of five caching agents that owns a line, and a five-bit presence vector, indicating which of the five caching agents has each line present. This state information is shown in FIG. 4. The sum of the number of bits representing the state of each snoop filter entry is 1 bits+3 bits+5 bits=9 bits. There are 16K lines in each of three agents and 64 lines in each of two agents, so the total number of bits required to represent the state of all snoop filter entries is 9 bits×(16K lines×3 agents+64 lines×2 agents)=433K bits. This is represented in a large SRAM cell array.

Figure 5:
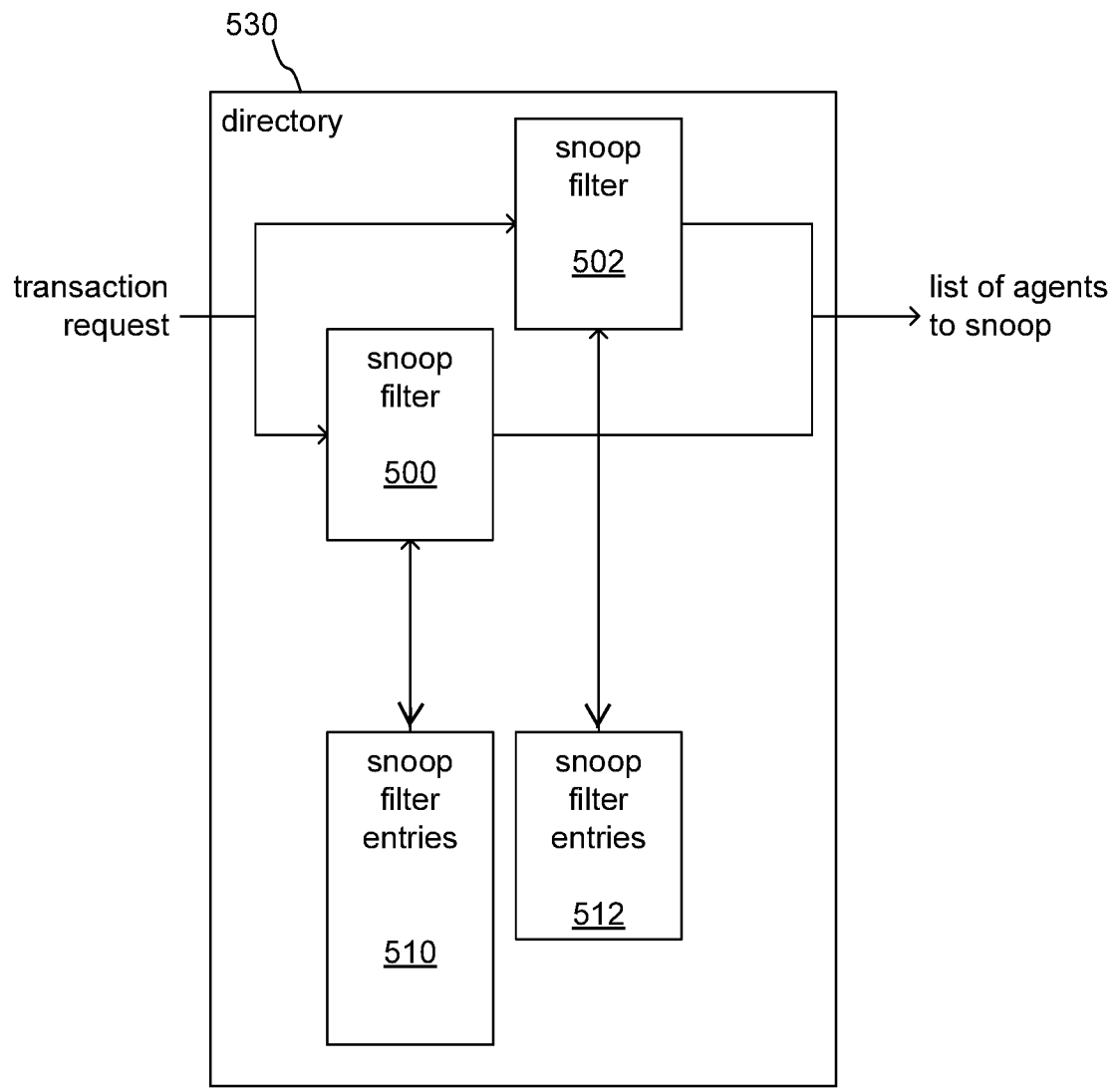
FIG. 5 illustrates a multiplicity of snoop filters within a directory and their associated sets of snoop filter entries in accordance with the various aspects of the invention.

Referring again to FIG. 2, FIG. 3 and now to FIG. 5, an embodiment, in accordance with the aspects of the invention, is shown and includes a directory 530. The directory 530 includes snoop filter 500 and snoop filter 502. The snoop filter 500 is associated with agent 0, agent 1, and agent 2. Snoop filter 502 is associated with agent 3 and agent 4. Snoop filter 500 stores snoop filter entry information in snoop filter entries 510. Snoop filter 502 stores snoop filter entry information in snoop filter entries 512. While this embodiment is shown as an example that includes two snoop filters, it will be evident that the scope of the invention is not limited by the number of snoop filters in the directory, such as directory 530.

Transaction requests received by the directory are sent to both snoop filters 500 and 502. Each snoop filter accesses information from its set of snoop filter entries and uses that information to produce a list of caching agents to snoop. The lists from both snoop filters are concatenated to produce an output list of agents for the directory to snoop.

Figure 6:
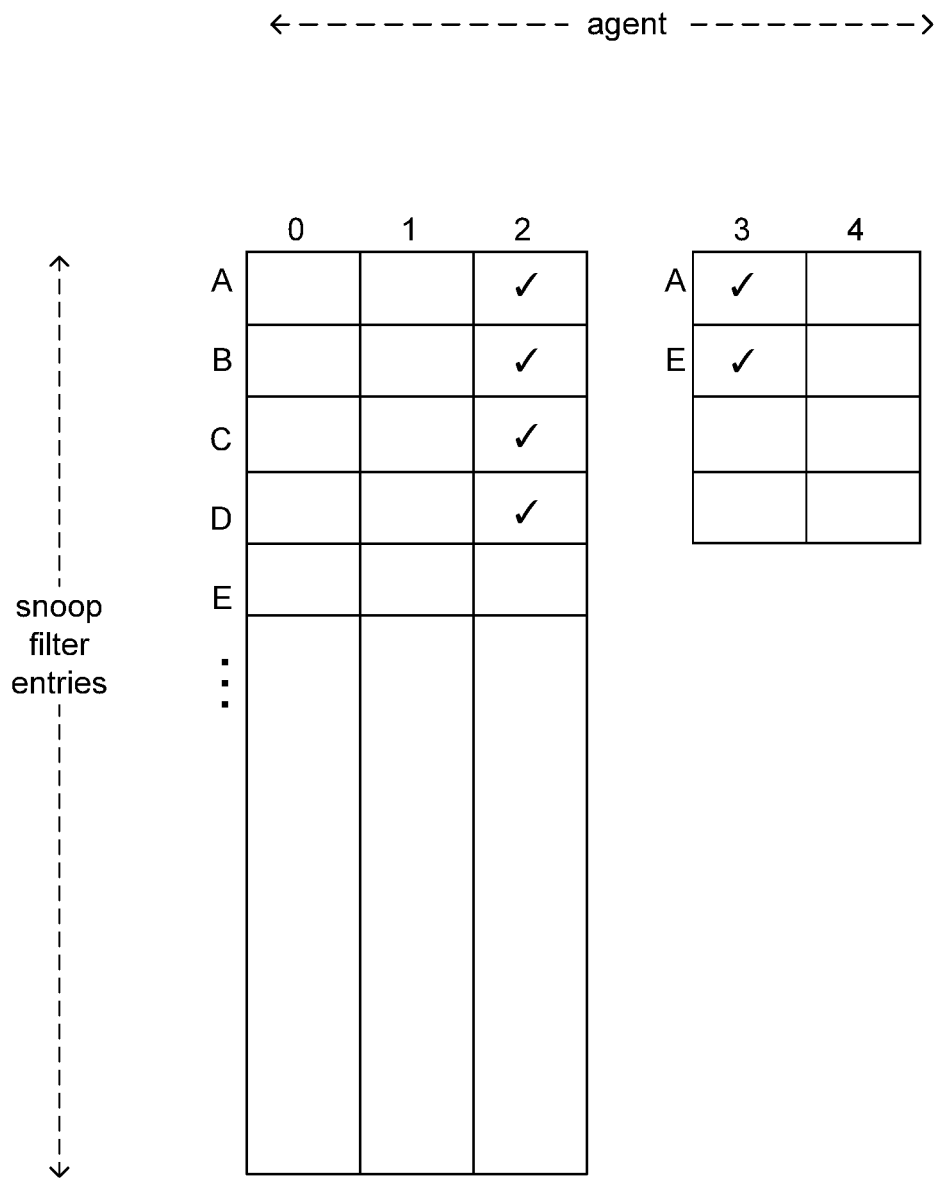
FIG. 6 illustrates the presence of cache lines within caching agents as represented by two sets of snoop filter entries in accordance with the various aspects of the invention.

Referring to FIG. 5 and now to FIG. 6, in accordance with the aspects of the invention, a representation of the state of the system with the same system caching state as FIG. 2 is shown. This representation corresponds to the embodiment of FIG. 5 in that the columns for caching agent 3 and caching agent 4 are shown separately from those of caching agent 0, caching agent 1, and caching agent 2. The snoop filter 500 uses an owner pointer and presence vector algorithm, by which a request for address A will cause a snoop to be sent to caching agent 2 only. The snoop filter 502 uses a simple presence vector algorithm, by which the request will cause a snoop to be sent to caching agent 3 only. Together, the snoop filters will cause a snoop to be sent to caching agent 2 and to caching agent 3.

According to the aspects of the invention, agent 0, agent 1, and agent 2 are CPUs. They are present in a CPU power domain. Agent 3 is a GPU and agent 4 is a DMA engine, each of which implements a coherent cache and are part of a secondary power domain.

Figure 7:
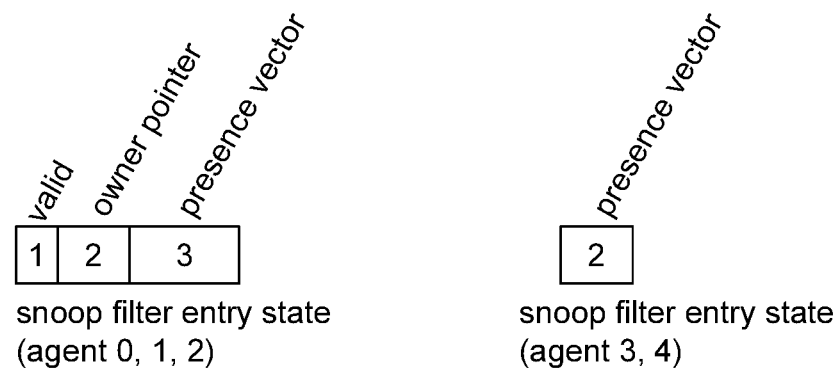
FIG. 7 illustrates snoop filter entry state information for a system of two snoop filters, each with different information in each entry within a set of snoop filter entries, and a calculation of bits of storage in accordance with the various aspects of the invention.

Referring now to FIG. 7, in accordance with the aspects of the invention, each snoop filter entry in the set of snoop filter entries 510 stores a valid bit, a two-bit owner pointer, and a three-bit presence vector. In accordance with the aspects of the invention, each snoop filter entry in the set of snoop filter entries 512 stores a two-bit presence vector, and no valid bit or owner pointer. Validity can be determined by logically ORing the two presence vector bits. The total number of snoop filter entries in the set of snoop filter entries 510 is 49,152, to accommodate the total number of lines that may be present in caching agent 0, caching agent 1, and caching agent 2. The total number of snoop filter entries in the set of snoop filter entries 512 is 128, to accommodate the total number of lines that may be present in caching agent 3 and caching agent 4. Therefore, the total number bits required to represent the state of all snoop filter entries is 6 bits×(16K lines×3 agents)+2 bits×(64 lines×2 agents)=288K bits.

Systems that embody the aspects of invention are typically designed by describing their functions in hardware description languages. Therefore, the invention is also embodied by such hardware description languages. Furthermore, such descriptions can be generated by computer aided design (CAD) software that allows for the configuration of systems and generation of the hardware descriptions in a hardware description language. Therefore, the invention is also embodied in such software.

In accordance with the aspects of the invention as captured in one embodiment, a method is disclosed that includes creating a hardware description of hardware that embodies a system according to the invention. The method includes accepting a specification of snoop filters, including the type of snoop filter, the number of cache line entries represented, and an amount of information associated with each entry, among other input information. In accordance with some aspects of the invention, each snoop filter is associated with one or more caching agents in a system. Based on that information, the system is appropriately configured and a hardware description is outputted. According to the aspects of the invention as embodied in the method, the hardware that is described accepts an address and outputs a presence vector, which may be precisely or coarsely encoded, or an owner pointer, or both. The hardware that is described also provides mechanisms to update, replace, and maintain stored data.

In accordance with the teaching of the invention a computer and a computing device are articles of manufacture. Other examples of an article of manufacture include: an electronic component residing on a mother board, a server, a mainframe computer, or other special purpose computers, each having one or more processors (e.g., a Central Processing Unit (CPU), a Graphical Processing Unit (GPU), or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated or captured in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

Therefore, the scope of the invention, therefore, is not intended to be limited to the various aspects and embodiments discussed and described herein. Rather, the scope and spirit of invention is embodied by the appended claims.

What is claimed is:

1. A system comprising:
a directory including:
a first snoop filter having a plurality of entries; and
a second snoop filter having a plurality of entries;
a first plurality of coherent caching agents in communication with the directory, wherein the first plurality of coherent caching agents are associated with the plurality of entries in the first snoop filter to track entries actively in-use by the first plurality of coherent caching agents; and
a second plurality of coherent caching agents in communication with the directory, wherein the second plurality of coherent caching agents are associated with the plurality of entries in the second snoop filter to track entries actively in-use by the second plurality of coherent caching agents,
wherein each of the first snoop filter's plurality of entries includes a valid bit, a plurality of owner pointer bits, and a plurality of presence vector bits for each of the first plurality of coherent caching agents, and
wherein each of the second snoop filter's plurality of entries includes a presence vector and no valid bit and no owner pointer bits for each of the second plurality of coherent caching agents and each presence vector includes two bits that are logically ORed to determine validity for that presence vector.

2. The system of claim 1 wherein the first snoop filter uses a filtering algorithm and the second snoop filter does not use the filtering algorithm.

3. The system of claim 1 wherein the number of entries in the first snoop filter and the number of entries in the second snoop filter are different.

4. The system of claim 1, wherein the first snoop filter's presence vector and the second snoop filter's presence vector are concatenated to produce an output list of caching agents to be snooped.

* * * * *